United States Patent [19]

Sato et al.

[11] Patent Number: 4,670,874
[45] Date of Patent: Jun. 2, 1987

[54] COMMUNICATIONS SYSTEM FOR TRANSMITTING AND RECEIVING DATA AND VOICE SIGNALS SIMULTANEOUSLY THROUGH 2-WIRE SIGNAL LINES

[75] Inventors: Kazuhiro Sato, Yokohama; Yoshimi Iijima, Kawasaki; Hiroyoshi Mori, Yokohama, all of Japan

[73] Assignee: Fujitsu Limited, Kawasaki, Japan

[21] Appl. No.: 681,288

[22] Filed: Dec. 13, 1984

[30] Foreign Application Priority Data

Dec. 16, 1983 [JP]  Japan ................................. 58-238551

[51] Int. Cl.⁴ ............................................... H04J 3/12
[52] U.S. Cl. .................................... 370/110.1; 370/29; 370/111; 379/93
[58] Field of Search ................... 370/110.1, 24, 29, 76, 370/83, 99, 111; 179/2 DP

[56] References Cited

U.S. PATENT DOCUMENTS

| | | | |
|---|---|---|---|
| 3,824,347 | 7/1974 | Sorber et al. | 179/2 DP |
| 3,875,339 | 4/1975 | Gruen et al. | 179/2 DP |
| 4,306,116 | 12/1981 | McClure et al. | 179/2 DP |
| 4,476,559 | 10/1984 | Brolin et al. | 370/110.1 |

Primary Examiner—Douglas W. Olms
Assistant Examiner—Wellington Chin
Attorney, Agent, or Firm—Staas & Halsey

[57] ABSTRACT

A communications system for transmitting and receiving data and voice signals simultaneously on 2-wire signal lines, which superposes and extracts high frequency modulated data signals using a high frequency transformer which is coupled to the 2-wire signal line. The transformer has two windings which are short-circuited with respect to high frequency components, but which pass low frequency voice signals between the 2-wire signal line and a low frequency hybrid circuit.

17 Claims, 9 Drawing Figures

FIG. I.
(PRIOR ART)

COMMUNICATIONS SYSTEM FOR TRANSMITTING AND RECEIVING DATA AND VOICE SIGNALS SIMULTANEOUSLY THROUGH 2-WIRE SIGNAL LINES

BACKGROUND OF THE INVENTION

The present invention relates to communications systems, and more particularly to data over voice (DOV) communications equipment which simultaneously transmits and receives voice and data signals through a common 2-wire signal line.

The DOV communications system is a known technique for simultaneously transmitting and receiving an analog voice signal and a digital data signal (e.g., a control signal, other general data information, etc.) through a common 2-wire signal line. The DOV communications system is a so-called band division system, in which the digital data is FSK (Frequency Shift Keying) modulated on a high frequency carrier signal and is superposed on a signal line. Therefore, it is easy to separate the high frequency FSK modulated data signal from the low frequency voice signal by a filter cirucit.

FIG. 1 is a block diagram of an exchange (EX) side of a prior art DOV system. Voice signals and FSK modulated data signals are received from a terminal (TE) side of the system through a plurality of 2-wire signal lines $L_1, L_2, L_3, \ldots L_N$. The signals are received as a voltage difference between the signal lines 8 and 9 and are converted to 4-wire signals by a hybrid circuit 38. From the exchange (EX) side, a DC (Direct Current) voltage $-V$ is provided to the terminal through the 2-wire signal lines $L_1, L_2, L_3, \ldots, L_N$. A capacitor 39 is connected to the teminal side of the hybrid circuit 38 to allow transmission of the voice signals and data signals to the 4-wire signals lines. On the exchange side of the hybrid circuit 38, a center tap of a hybrid coil 41 is coupled to a balancing resistor. If the balancing resistor is theoretically modulated in order to match the impedance observed from the side of the 4-wire signal line to the impedance observed from the side of the 2-wire signal line, then the signals transmitted from the terminal side only appear at a pair of signal lines S1-R (S2-R, S3-R, . . . , SN-R) of the 4-wire signal lines 50-1 (50-2, 50-3, . . . , 50-N). Similarly, signals which are transmitted from the exchange side through a pair of signal lines S1-T (S2-T, S3-T, . . . , SN-T) of the 4-wire signal lines 50-1 (50-2, 50-3, . . . , 50-N) do not appear at the pair of signal lines S1-T (S2-T, S3-T . . . , SN-T).

Therefore, a voice signal which is transmitted on the pair of signal lines S1-T (for exemplary purposes, only the L1 set of lines is considered here and below) is filtered by a filter 10 and converted to a digital signal by an A/D converter 12. The digital signal is then multiplexed by a multiplexer 14, sent on a highway THW and processed by other portions of the exchange (not shown). A voice signal which is sent from other portions of the exchange side through a highway RHW is distributed to an appropriate line by a demultiplexer 16. When it is determined that the digital signal from the highway RHW should be distributed to the 2-wire signal line L1, the digital signal is sent to a D/A converter 18 (where it is converted to an analog signal), and the analog signal is sent to the 2-wire signal line L1 through a filter 20 and the hybrid circuit (i.e., 4-wire/2-wire converter) 38.

On the other hand, a data signal which is transmitted on the 2-wire signal line L1, is provided to a pair of signal lines S1-R of the set of 4-wire signal lines 50-1, via the hybrid circuit 38, in the same way as the voice signal. The data signal consists of a FSK modulated signal which is obtained by modulating the carrier with data at a higher frequency than the voice frequency band. The data signal is rejected by the filter 10 which is tuned for the voice signal, but is sent to a demodulator 24 through a filter 22. The demodulated output is passed through a selector 80 into a microcomputer 56. Thereafter, the signal enters a FIFO (First In First Out) register 26 and is sent to a control unit (not shown) of the exchange through a scanning multiplexer 28. A data signal which is sent from the control unit is input to a shift register 81 and is then sent to the 2-wire signal line L1 through a FIFO register 30, the selector 80, the microcomputer 56, an AND gate 32, a modulator 34, a filter 36 and the hybrid circuit 38. The signal flow is identical for the other 2-wire signal lines.

FIG. 2 is a block diagram of the terminal (TE) side and the exchange (EX) side of a prior art DOV system. At a hybrid circuit 38A of the terminal side, a DC power supply cirucit (i.e., DC/DC converter) 83 is connected to a hybrid coil 84. The DC power supply circuit 83 is supplied with DC power from the power source $-V$ of the exchange side through the 2-wire signal line L1, and supplies DC power to a control circuit C2 and to other circuits (not shown) which require DC power. Filters 10A and 20A are low pass filters and filters 22A and 36A are bandpass filters. These filters are provided for both the voice signal and the data signal systems and in both the transmitting and receiving directions. TD represents data to be transmitted, while RD represents received data. The exchange side illustrated in FIG. 2 is as described with respect to FIG. 1.

In the prior art equipment, as described above, the hybrid circuit 38 (38A) is required to convert both data and voice signals from 2-wire signals to 4-wire signals and vice versa. Therefore, the bandwidth of the hybrid circuit 38 (38A) is required to be wide, so that the hybrid circuit 38 (38A) is large and expensive. Moreover, the filters 10 and 20 (10A and 20A) are required for transmitting and receiving a voice signal, while filters 22 and 36 (22A and 36A) are required for transmitting and receiving a data signal. Further, these filters are required for each subscriber line in addition to the demodulator 24 and modulator 34. Accordingly, for N subscriber lines, N sets of hardware are required, thereby increasing the size of the equipment, the consumption of electrical power and the cost. Therefore, there has been a need in the art for a simplified and less expensive hybrid circuit for use in DOV communications systems.

SUMMARY OF THE INVENTION

It is an object of the present invention to provide a DOV communications system which has a reduced size, lower power consumption and lower cost than prior art equipment.

Particularly, it is an object of the present invention to provide a DOV communications system which inlcudes a narrow band hybrid circuit.

It is another object of the.present invention to provide a DOV communications system which does not require the use of filters for separating the voice signal and the data signal.

According to the present invention, there is provided a communications system for transmitting and receiving data and voice signals simultaneously on a 2-wire signal line, comprising superposing and extracting means, coupled to the 2-wire signal line, for receiving data signals and voice signals from the 2-wire signal line, for extracting the received data signals, for superposing data signals to be transmitted on voice signals to be transmitted and for transmitting the data and voice signals to be transmitted onto the 2-wire signal line; obstructing means, coupled to the superposing and extracting means, for receiving the received data signals and the received voice signals, for obstructing the received data signals, and for providing the received voice signals as an output; and a hybrid circuit, coupled to the obstructing means, for receiving the received voice signals and for transmitting the voice signals to be transmitted onto the 2-wire signal line via the obstructing means and the superposing and extracting means.

These together with other objects and advantages, which will be subsequently apparent, reside in the details of construction and operation, as more fully hereinafter described and claimed, reference being had to the accompanying drawings forming a part hereof, wherein like numerals refer to like parts throughout.

DESCRIPTION OF THE PREFERRED EMBODIMENT

Figure 1:
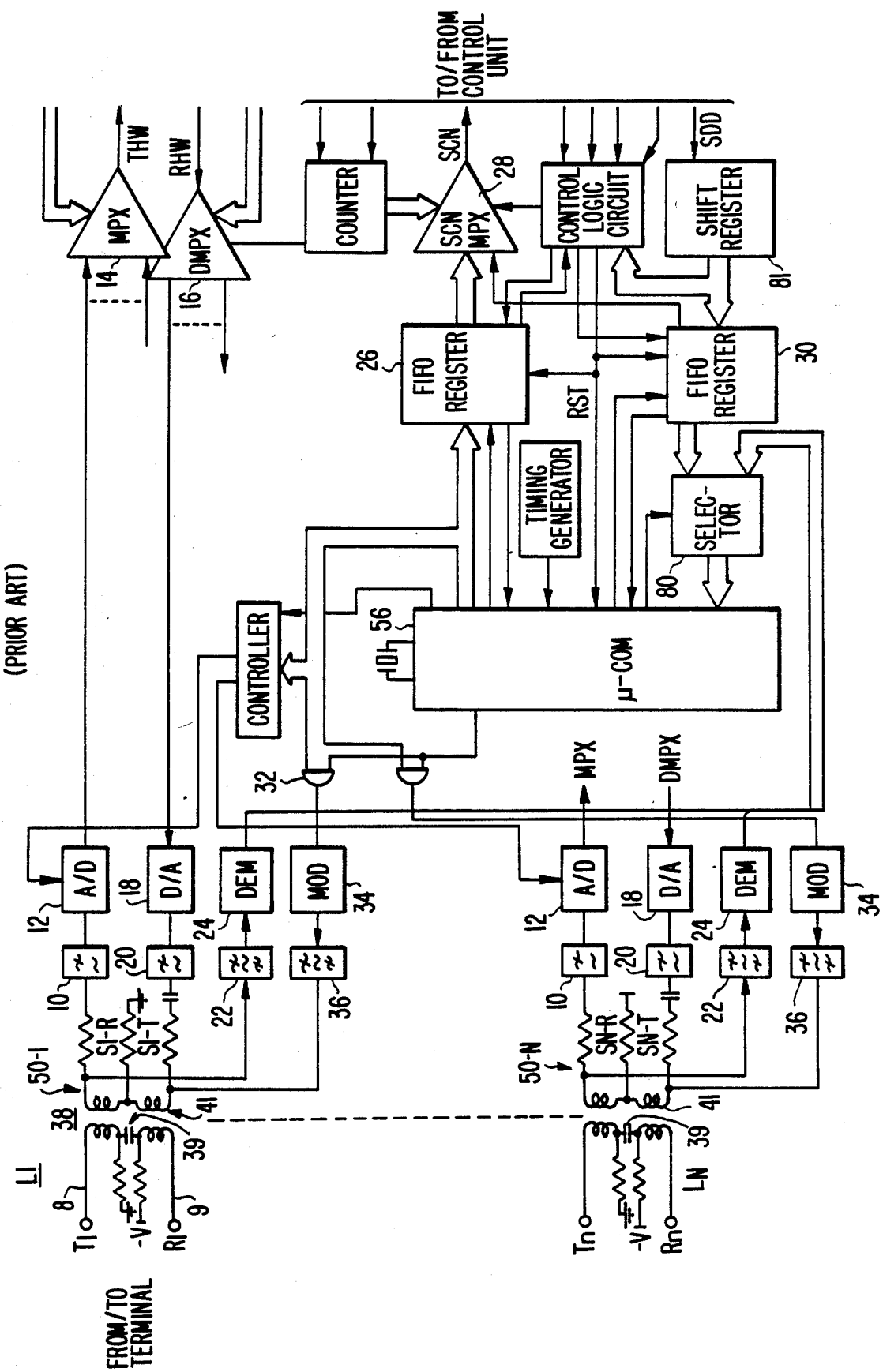
FIG. 1 is a block diagram of the exchange side of a prior art DOV system.
Figure 2:
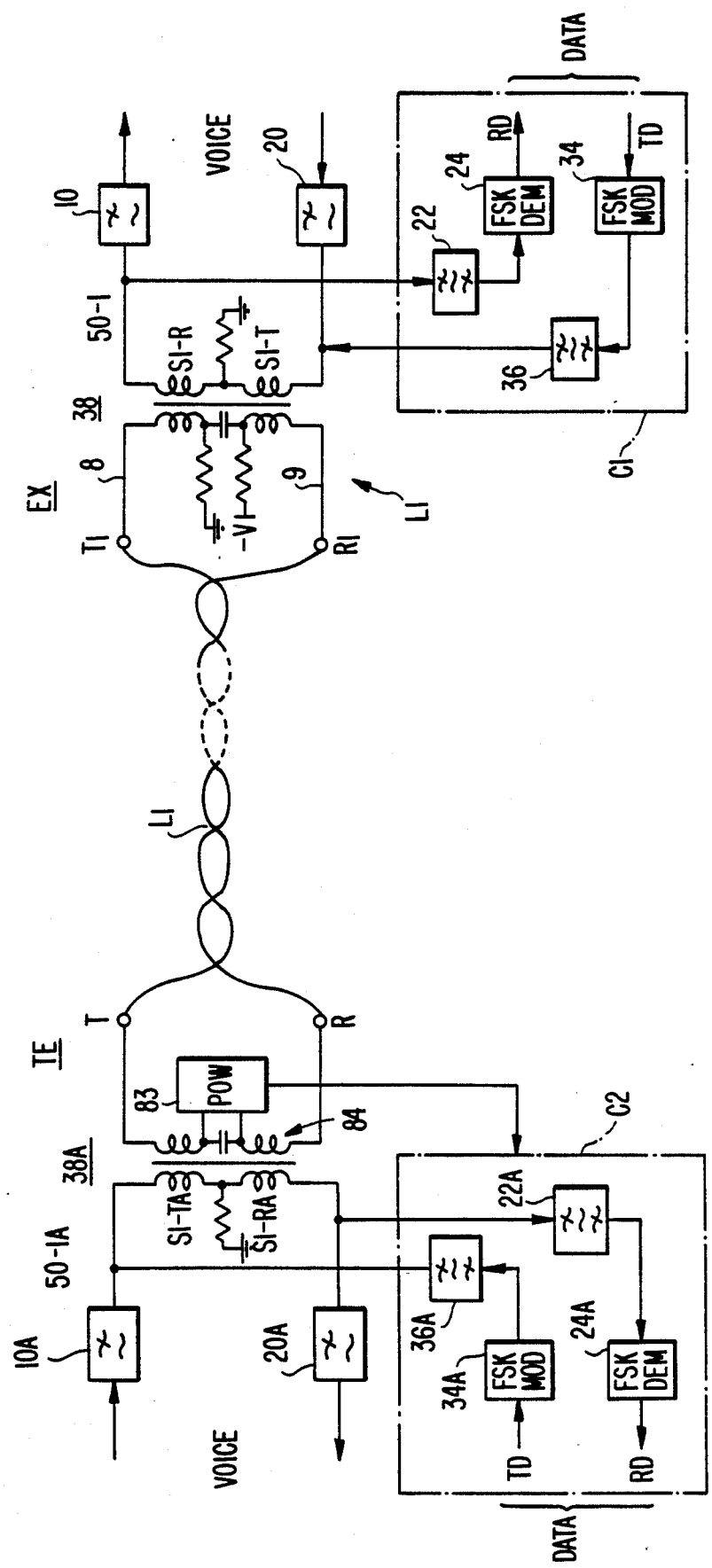
FIG. 2 is a block diagram of the exchange side and the terminal side of a prior art DOV system.
Figure 3:
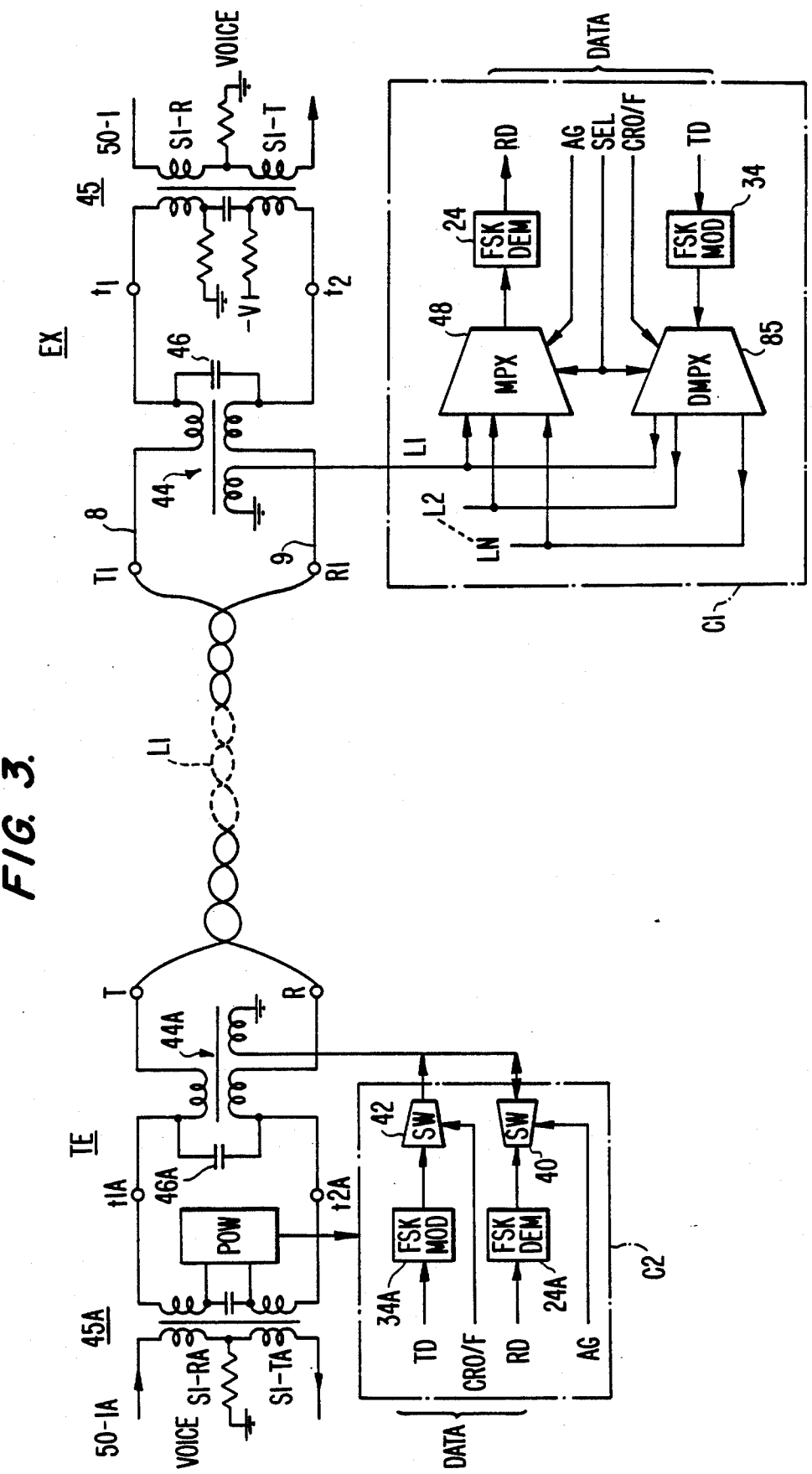
FIG. 3 is a block diagram of an embodiment of the communications system of the present invention.

FIG. 3 is a block diagram of an embodiment of this invention in which a time division system is employed for transmission and reception of data signals. Therefore, bandpass filters 22 and 36, which are used in the prior art equipment (FIGS. 1 and 2) for filtering the data signal, are eliminated. Instead, analog switches 40 and 42 select transmission and reception on a time division basis. The switches 40 and 42 are turned on and off by a receiving aperture gate signal AG and a carrier on-off signal CRO/F. The primary and secondary windings of three winding transformers 44, 44A, are connected to a 2-wire signal line L1, and the tertiary winding is connected to the input/output terminals of control circuit $C_1$ in the exchange side and control circuit $C_2$ in the terminal side. Low capacity capacitors 46 and 46A (for example 0.022 F.) are connected between the primary and secondary windings of the transformers 44 and 44A respectively to short-circuit these windings at high frequencies. Since the capacitance of capacitors 46, 46A and the inductance of the three windings are small, the transformers 44 and 44A can easily pass the voice signal frequency which is, for example, under 3.4 kHz. Therefore, transmission and reception of a voice signal can be accomplished between the terminal side and the exchange side on the 2-wire signal line $L_1$. The data signal can also be transmitted on the 2-wire signal line $L_1$ between the control circuits $C_1$ and $C_2$; however, since the data signal has a high frequency (for example, 175 to 190 kHz), this signal impinges on the capacitors 46 and 46A without any resulting voltage drop. Accordingly, hybrid circuits 45 and 45A which only convert the low frequency voice signal, can be used, the leakage of the data signal to the voice circuits in the terminal and exchange sides is prevented, and therefore the low pass filters 10 and 20 can be eliminated.

Figure 4:
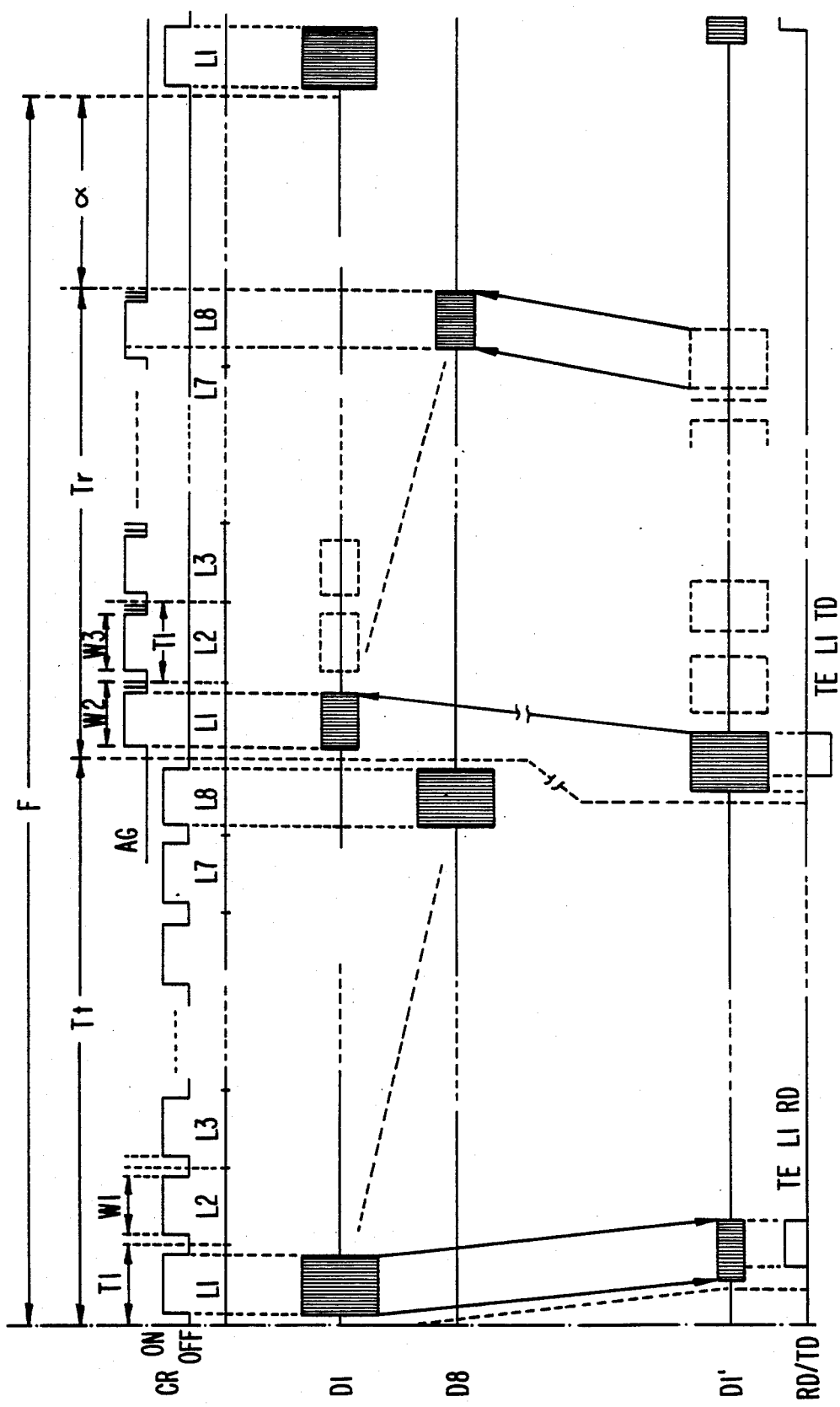
FIG. 4 is a timing diagram which shows the transmission/reception timing for the 2-wire signal line in FIG. 3.

Since the exchange is connected to many terminals, time division is carried out not only for transmission and reception but also for a plurality of terminals (i.e., plural 2-wire signal lines). In the example illustrated by the timing diagram of FIG. 4, 8 2-wire signal lines are used in common with the modulator 34 and the demodulator 24. Thus, in the exchange (EX) side, a common multiplexer 48 and demultiplexer 85 are used. FIG. 4 shows the transmission/reception timing for each of the 2-wire signal lines. In this figure, F represents one frame which is divided into a transmitting period $T_t$, a receiving peiod $T_r$ and a data processing period. Transmission and reception on the lines L1 ... L8 are sequentially conducted during the periods $T_t$ and $T_r$ as shown in the figure. Here, an example of numerical data is considered. Namely, the assigned period $T_1$ of each line is assumed to be 1024 μS while the transmission period $W_1$ is assumed to be 800 μS by eliminating the starting and ending periods (112 μS each) from the assigned period. The receiving period is between a maximum period W2 of 1008 μS and a minimum period W3 of 800 μS. Particularly, the period $T_1$ assigned to each line is 1024 μS, the switch for time division (not shown) opens 16 μS after the start of $T_1$, resulting in a receiving-ready condition, and the switch closes after a period of from W2 and W3 in accordance with the receiving timing of the data transmitted (including the response delay in the case of a distant party). When no data is received, the gate also opens but in this case, it closes after W2. The carrier on-off signal CRO/F and receiving aperture gate signal AG having the period and pulse duration indicated, are applied to the switches 40, 42, multiplexer 48, and demultiplexer 85 (FIG. 3). D1 ... D8 in FIG. 4 represent the FSK-modulated transmitting/receiving data of the lines L1 ... L8 in the exchange side, while D1' represents FSK-modulated transmitting/receiving data at the terminal of the 2-wire signal line L1.

For simplicity, a single subscriber is considered below. As an example, a voice signal is continuously transmitted to the transmission line L1 of FIG. 3 and a data signal is transmitted and received in the L1 period of $T_t$, $T_r$ in FIG. 4. Referring to prior art FIG. 2, the data signal and the voice signal must both pass through the hybrid circuits 38, 38A. Therefore, the hybrid circuit is required to have a bandwidth which is as wide as 200 Hz to 300 kHz; moreover, the hybrid circuits (i.e., transformer) are required to provide protection for magnetic saturation, thereby resulting in an increase in size because a DC power source current flows therein. However, in the present invention, the data signal does not pass through the hybrid circuits 45, 45A because they are short-circuited at high frequencies by the capacitors 46, 46A. Accordingly, the circuits 45, 45A only handle the voice signal and DC current, and they can be easily designed and manufactured with a small size. The hybrid circuit 45 and the control circuit C1 are mounted on printed circuit boards. In the prior art systems shown in FIG. 2, one printed circuit board is capable of holding 4 circuits. In contrast, the same board is capable of holding 8 circuits by employing the present invention.

Figure 5:
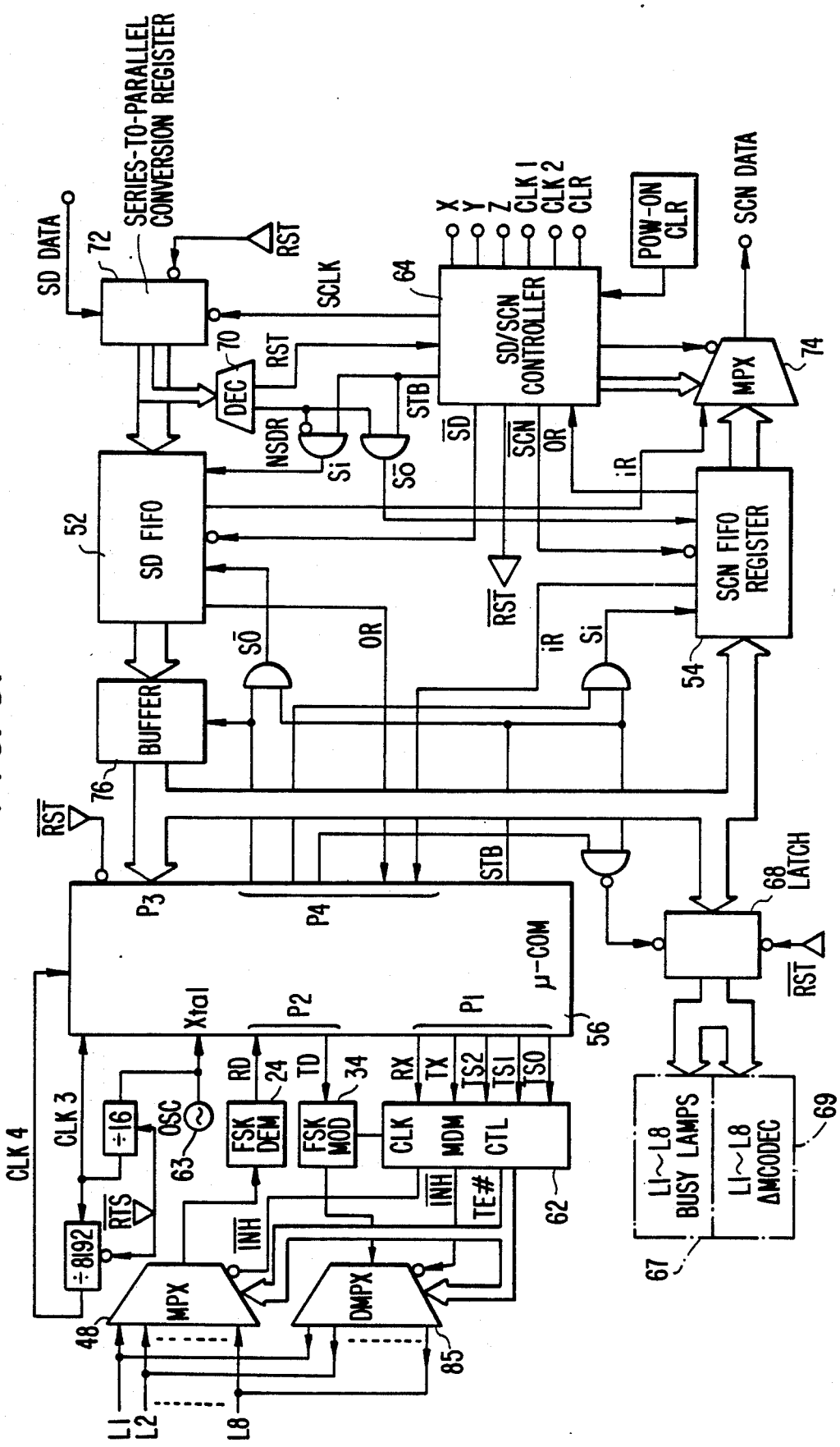
FIG. 5 is a block diagram of the control circuit C1 in FIG. 3.

The peripheral circuits are explained below. FIG. 5 is an embodiment of the control circuit C1 in the exchange side. This circuit comprises a SD (signal distribution)/SCN (scanning) control circuit 64, a SD FIFO register 52, a SCN FIFO register 54, an 8-bit microcomputer 56, a FSK modulator 34, a FSK demodulator 24, a modem control circuit 62, a multiplexer 48, a demultiplexer 85, and an 8-bit latch 68. The control circuit 64 receives card (the printed circuit board described above) selection address signals X, Y, Z, a system clock CLK 1 of 12.8 MHz, a synchronous clock CLK 2 of 800 kHz and a clear signal CLR from the exchange. The control circuit 64 also receives signals from the FIFO register 54 and the decoder 70 and generates a clock SCLK which controls clocking of SD data from the exchange to the series-to-parallel conversion register 72. The control circuit 64 further controls the multiplexer 74 which outputs the SCN data. The SD data enters the FIFO register 52 from the register 72 and is then sent to the microcomputer 56 through the buffer 76 which has three output conditions H (high), L (low) and H impedance. This signal (TD) is then sent to the FSK modulator 34 from port P2 and then to the appropriate channel among the 2-wire signal lines L1 . . . L8 by the demultiplexer 85. In contrast, the FSK-modulated signal sent from the 2-wire signal lines L1 . . . L8 (SCN DATA) is supplied to the microcomputer 56 through the multiplexer 48 and the FSK demodulator 24. It is then sent to the FIFO register 54 from port P3. The data is then sent to other portions of the exchange through multiplexer 74 which converts a parallel signal into a serial signal.

An oscillator 63 generates, for example, a 4 MHz signal which is directly input to the microcomputer 56 and is also used as the clock signal CLK 3 of 250 kHz and as the clock signal CLK 4 of 30.518 Hz after frequency division by 16 and 8,192. The SD, SCN data are fetched by the latch 68, causing 8-line busy lamps 67 to light and causing a $\Delta M$ coder/decoder (CODEC) 69 to be reset. RST is a reset signal, STB is a strobe signal, INH is an inhibit signal, OR is an output ready signal, IR is an input ready signal, SI is a shift in signal, SO is a shift out signal, NSDR is a next scanning data ready signal, RX, TX are transmitting, receiving selection signals, TS2 . . . TS0 are line (terminal) selection sigals.

Figure 6:
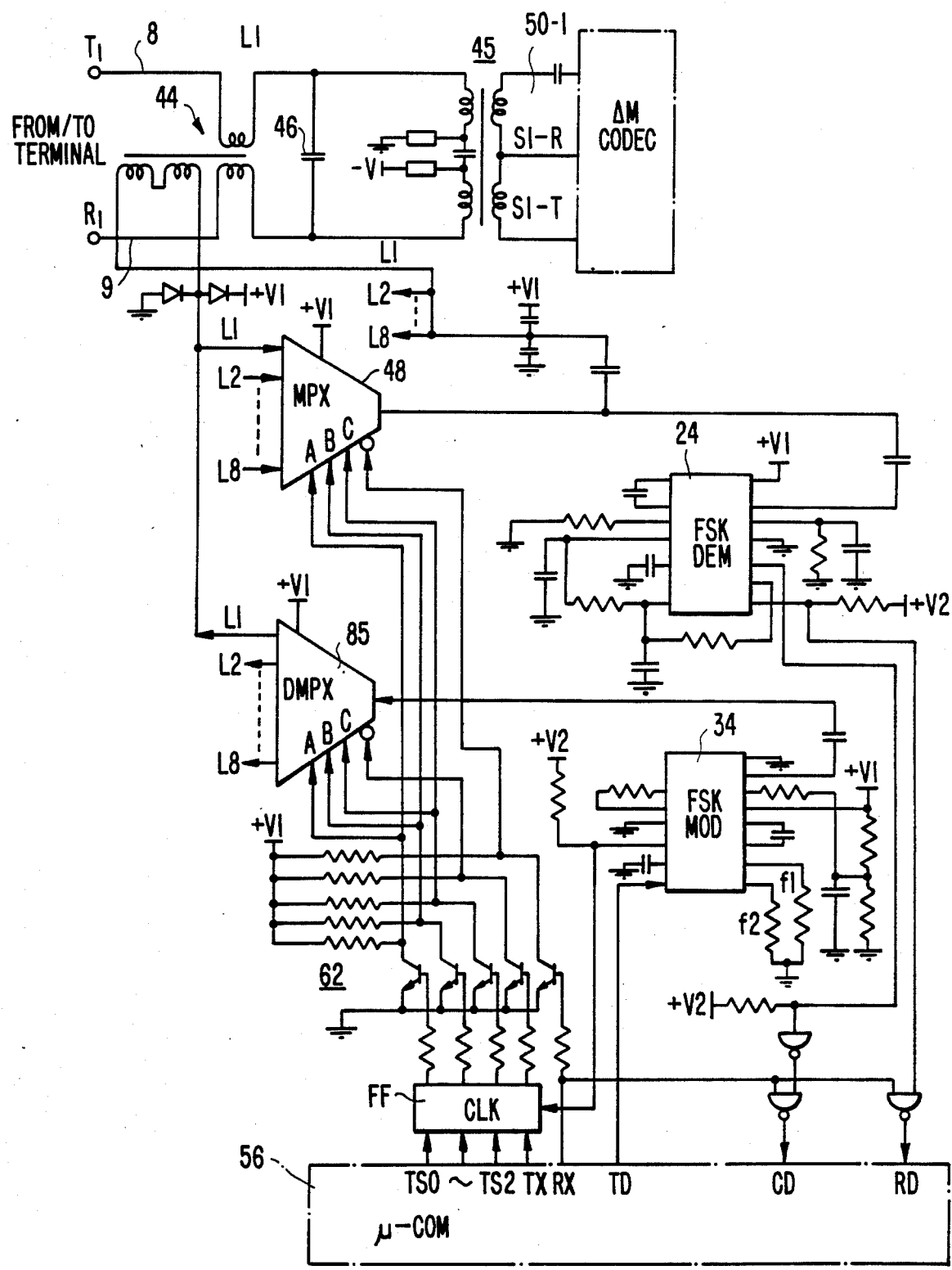
FIG. 6 is a detailed block diagram of the data signal modulation and demodulation circuitry of FIG. 3.

FIG. 6 is a detailed block diagram of the modulation and demodulation circuitry of FIG. 3. In the preferred embodiment, the FSK modulator and demodulator 24, 34 are formed in a single integrated curcuit as a modem. Since modulation is carried out in the FSK mode, the frequencies f1, f2 are selected in accordance with binary data bits 1 and 0 (for example "1"=190 kHz, "0"=160 kHz). The frequencies f1, f2 of modulator 34 are determined by resistance values. CD is a carrier detection signal and FF is a flip-flop. The operation of the elements of FIG. 6 will be described below with reference to the timing diagrams of FIG. 7 to 9.

Figure 7:
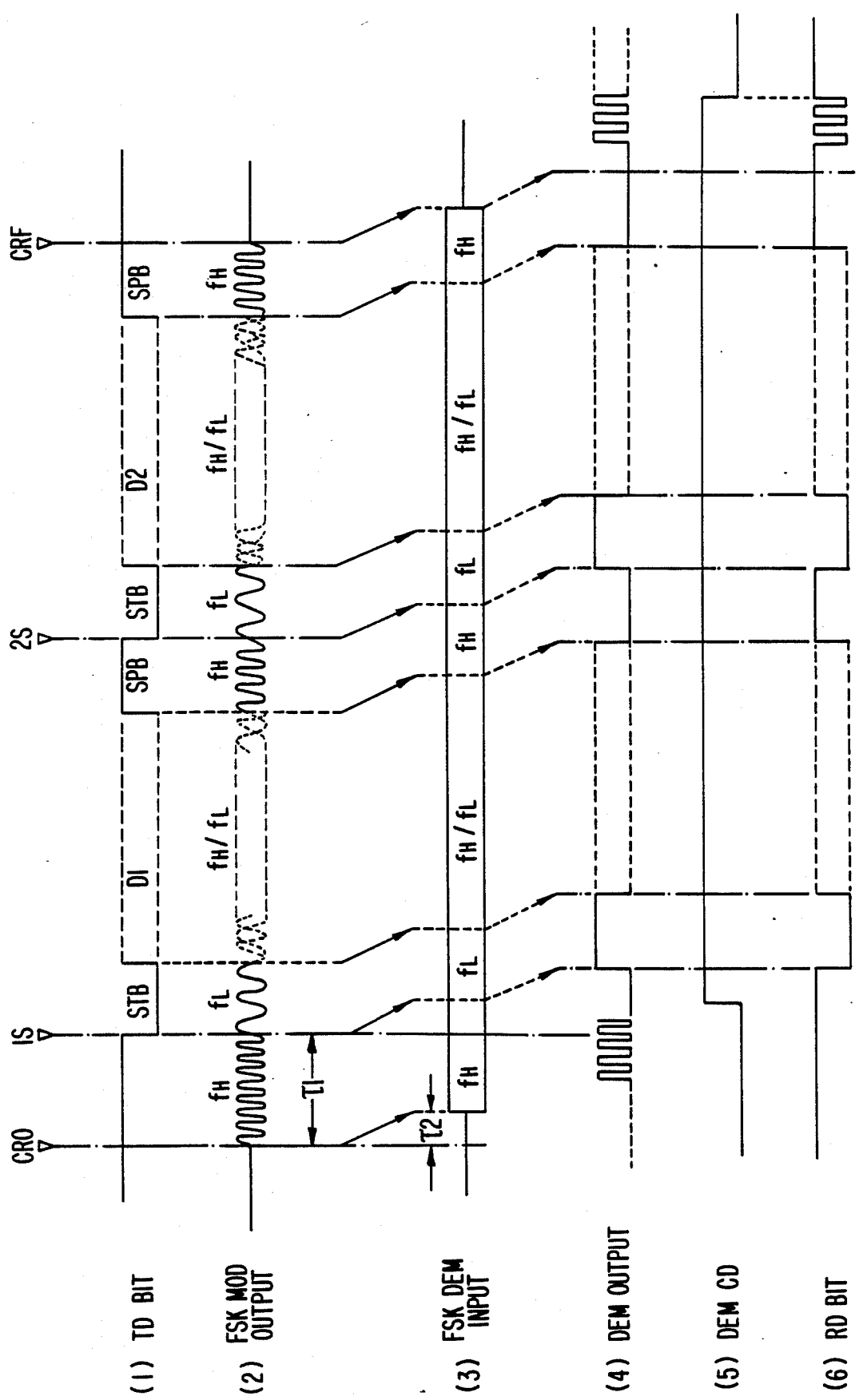
FIG. 7 is a timing diagram of the input/output signals of the modulator and demodulator of FIG. 6.
Figure 8:
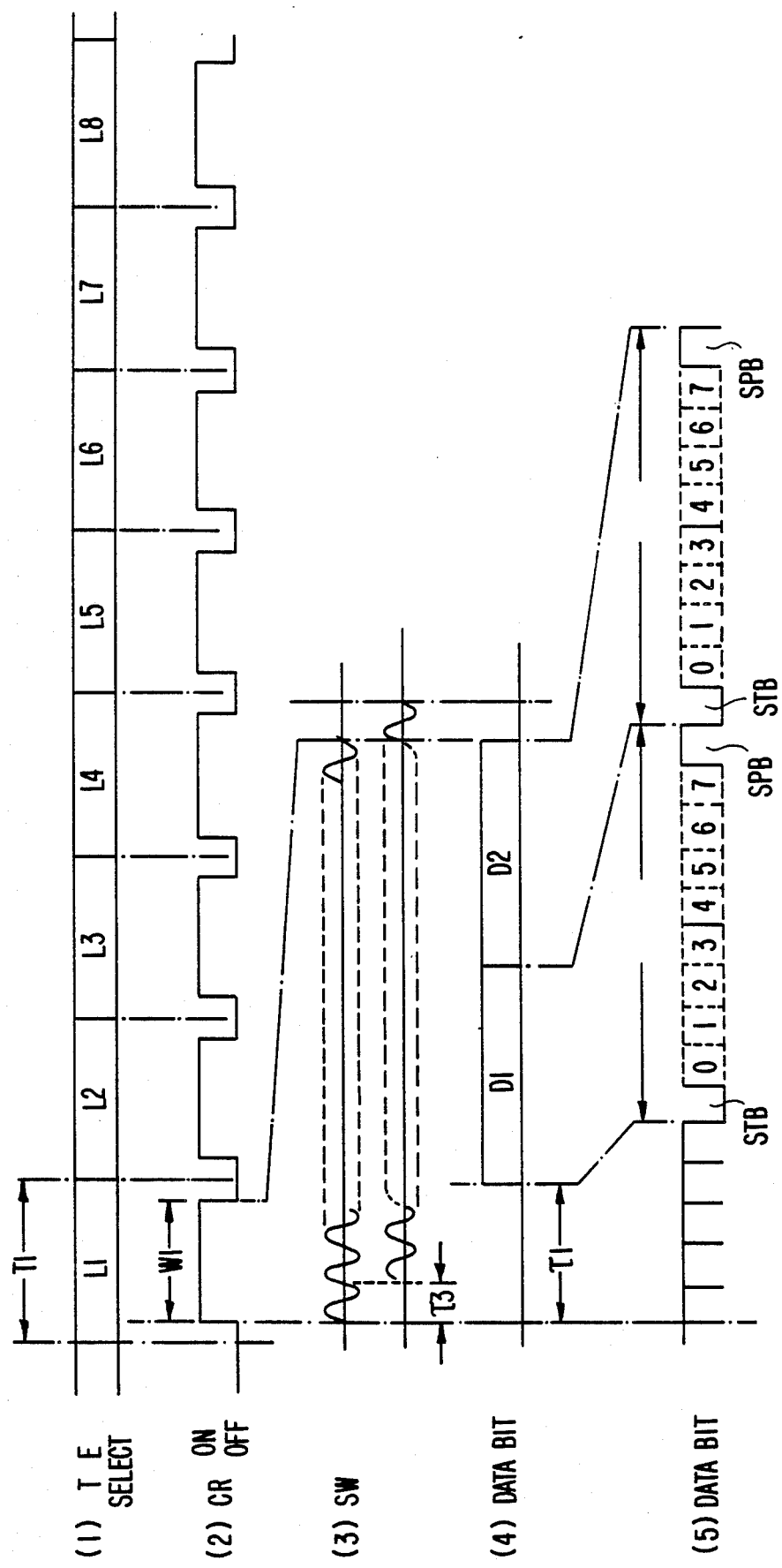
FIG. 8 is a detailed transmitting timing diagram corresponding to the transmission portion of FIG. 4.
Figure 9:
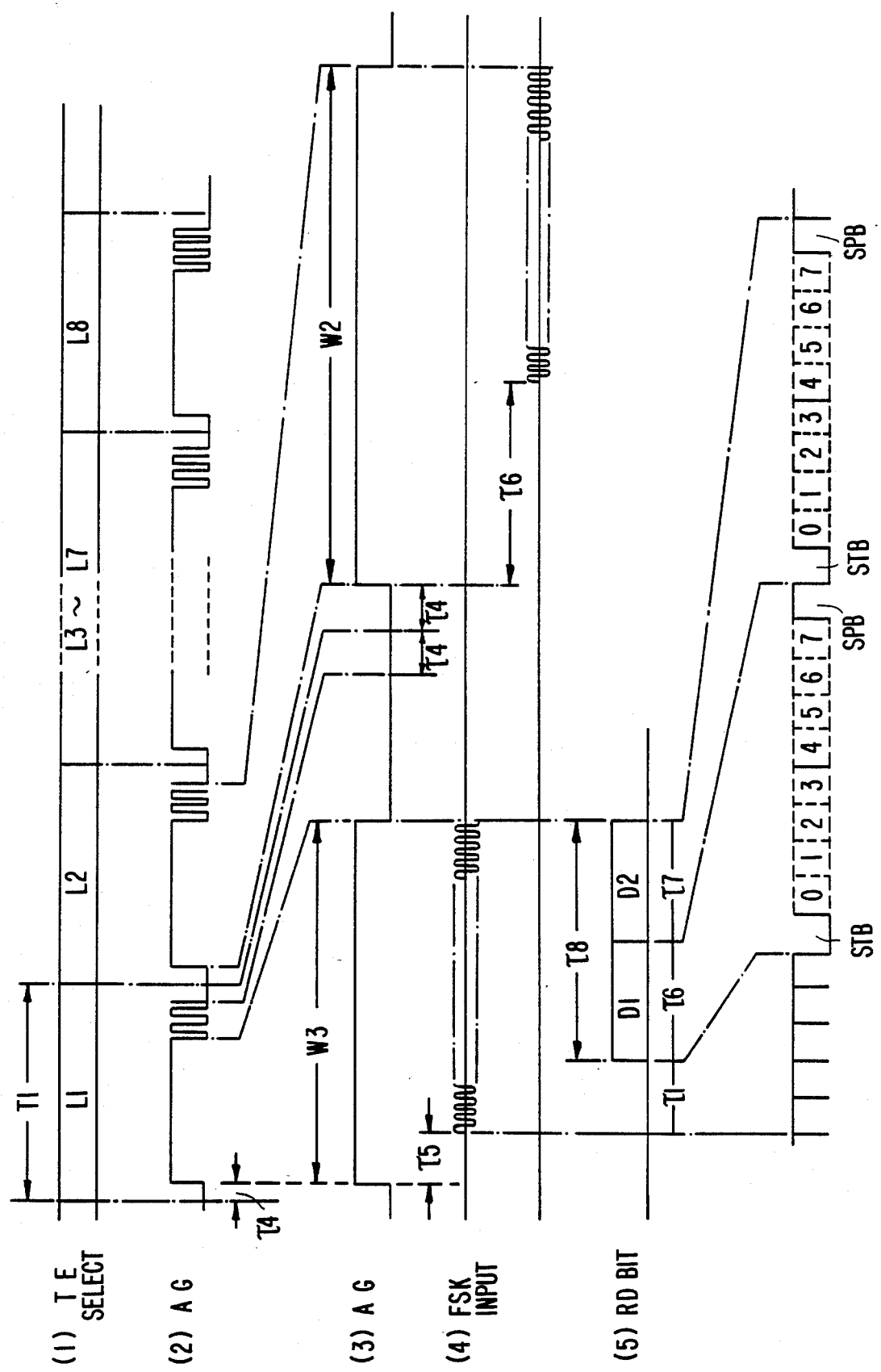
FIG. 9 is a detailed receiving timing diagram corresponding to the reception portion of FIG. 4.

FIG. 7 to FIG. 9 are timing diagrams showing the timing for the signals in FIG. 3. FIG. 7 is a diagram of the input/output timing of the modem. CRO represents carrier on, 1S, 2S are first and second byte transmissions, and CRF is carrier off. These signals are controlled by firmware in the microcomputer 56. FIG. 7(1) shows the flow of transmitting data bits, including a start bit STB, first and second bytes of data D1 and D2 and a stop bit SPB. FIG. 7(2) shows the output of the FSK modulator, where STB corresponds to a low frequency $f_L$ SPB corresponds to a high frequency $f_H$, and data is indicated by $f_L$ or $f_H$ in accordance with data bits "1" or "0". After CRO is on, data is not transmitted immediately, but is transmitted after a delay time of $\tau_1$ called the preamble. During this period $\tau_1$, the signal $f_H$ is transmitted. FIG. 7(3) shows an input of the FSK demodulator, which is the same as an output of the modulator 34 (FIG. 7(2)), and there is a transmission delay $\tau_2$ depending on cable length. FIG. 7(4) indicates an output of the demodulator 24, while FIG. 7(5) indicates a carrier detection signal of the demodulator 24 and FIG. 7(6) indicates a flow of receiving data which becomes an input to the microcomputer 56.

FIG. 8 shows the transmitting timing and FIG. 9 shows the receiving timing, namely, the details of FIG. 4. FIG. 8(1) shows the period $T_1$ assigned to each of the lines L1 . . . L8. The middle portion $W_1$ of the period $T_1$ (for example, where the starting and ending portions of the period T1 (1024 $\mu$S), are subtracted therefrom as described above), is used as the transmitting period. The carrier on-off signal if FIG. 8(2) shows this operation. FIG. 8(3) is an enlarged view of FIG. 8(2) in which the sine wave obtained by the FSK modulation is placed within the period $W_1$ of 800 $\mu$S. Ideally, the carrier on-off for time division transmission is realized at the O (V) point on the carrier sine wave in order to prevent the noise which is usually generated by carrier on-off. Therefore, the period $\tau_3$ of the carrier (5.5 $\mu$S in this example), is delayed in some cases. Accordingly, the period W1 is 800+5.5 $\mu$S to be exact. During the transmitting period T1 of each channel, two data bytes are transmitted as described above. FIG. 8(4) shows such a data bit flow and FIG. 8(5) is an enlarged view of FIG. 8(4), wherein the two bytes are divided into 4 sections and the last 4 bits are flags and parity bits.

FIG. 9 is the timing chart for receiving. FIG. 9(1) shows the period assigned to each line LN which is equal to the transmitting period T1 of 1024 $\mu$S. The actual receiving period corresponds to the intermediate portion between the starting and ending portions of period T1. As described above, the maximum period is $W_3$, while the minimum period is $W_2$. The starting and ending periods $\tau_4$ to be eliminated are 16 $\mu$S in this example. The receiving period is determined by the receiving aperture gate signal AG shown by FIG. 9(2) having a duration which depends on the time $\tau_5 \sim \tau_6$ which elapses before the data is received from the transmitting side. The minimum period $\tau_5$ is 3 $\mu$S, while the maximum period $\tau_6$ is 192 $\mu$S. FIG. 9(3) is an enlarged view of FIG. 9(2) and, FIG. 9(4) shows the FSK input of the lines L1 and L2. FIG. 9(5) shows the received data RD.

As described above, this invention provides a communications system which has a reduced size and weight and also a simplified structure as compared to prior art systems.

The many features and advantages of the present invention are apparent from the detailed specification and thus it is intended by the appended claims to cover all such features and advantages of the system which fall within the true spirit and scope of the invention.

Further, since numerous modifications and changes will readily occur to those skilled in the art, it is not desired to limit the invention to the exact construction and operation shown and described, and accordingly all suitable modifications and equivalents may be restored to, falling within the scope of the invention.

What is claimed is:

1. A communications system for transmitting and receiving voice signals and data signals which have a higher frequency than the voice signals, simultaneously on a 2-wire signal line, comprising:
   transmitting and extracting means, coupled to the 2-wire signal line, for receiving data signals and voice signals from the 2-wire signal line, for passing the voice signals, for extracting the received data signals which have a higher frequency than the voice signals, and for transmitting voice signals and data signals to be transmitted onto the 2-wire signal line;
   obstructing means, coupled to said transmitting and extracting means, for receiving the received voice signals, for obstructing the received data signals and for providing the received voice signals as an output; and
   a hybrid circuit, coupled to said obstructing means, for receiving the received voice signals which pass through said transmitting and extracting means and said obstructing means and for transmitting the voice signals to be transmitted onto the 2-wire signal line via said obstructing means and said transmitting and extracting means, said obstructing means acting as a high impedance against the frequency of the voice signals, and as a low impedance against the higher frequency of the received data signals to prevent the received data signals from being transmitted to said hybrid circuit.

2. A communications system according to claim 1, further comprising data signal transmitting/receiving means, coupled to said transmitting and extracting means, for separately receiving the received data signals extracted by said transmitting and extracting means and transmitting the data signals to be transmitted to said transmitting and extracting means based on a predetermined time division mode.

3. A communications system according to claim 2, wherein the transmitted and received data signals comprise frequency shift keying (FSK) modulated signals.

4. A communications system according to claim 1, wherein said transmitting and extracting means comprises a transformer coupled to the 2-wire signal line.

5. A communications system according to claim 4, wherein said transformer has first, second and third windings, and wherein the first and second windings are respectively connected to the wires forming the 2-wire signal line, and said third winding is coupled to said data signal transmitting/receiving means.

6. A communications system according to claim 5, wherein said obstructing means comprises a capacitor coupled between the first and second windings of said transformer.

7. A communications system according to claim 4, wherein said obstructing means comprises a capacitor coupled to said transformer.

8. A communications system according to claim 1, wherein said obstructing means comprises a low capacity capacitor coupled to said transmitting and extracting means.

9. A communications system for transmitting and receiving voice signals and data signals which have a higher frequency than the voice signals, simultaneously on a 2-wire signal line, comprising:
   a transformer having first and second windings respectively coupled to the wires forming the 2-wire signal line and having a third winding, the first and second windings for conducting voice signals received on the 2-wire signal line and voice signals to be transmitted on the 2-wire signal line, the third winding for extracting data signals received on the 2-wire signal line and for transmitting voice signals and data signals to be transmitted onto the 2-wire signal line;
   obstructing means, coupled to the first and second windings of said transformer, for obstructing the data signals while passing the received voice signals and voice signals to be transmitted on the 2-wire signal line; and
   a hybrid circuit, coupled to said obstructing means and to the first and second windings of said transformer, for receiving the voice signals which pass through said transformer and said obstructing means, and for transmitting voice signals to be transmitted onto the 2-wire signal line via said obstructing means and said transformer, said obstructing means acting as a high impedance against the higher frequency of the received data signals to prevent the received data signals from being transmitted to said hybrid circuit.

10. A communications system according to claim 9, wherein said obstructing means comprises a capacitor coupled to the first and second windings of said transformer.

11. A communications system according to claim 10, further comprising data signal transmitting/receiving means, coupled to the third winding of said transformer, for causing said transformer to extract the received data signals and transmit the data signals to be transmitted based on a predetermined time division mode.

12. A communications system according to claim 11, wherein the transmitted and received data signals comprise frequency shift keying (FSK) modulated signals.

13. A communications system according to claim 9, further comprising data signal transmitting/receiving means, coupled to the third winding of said transformer, for causing said transformer to extract the received data signals and transmit the data signals to be transmitted based on a predetermined time division mode.

14. A communications system according to claim 13, wherein the transmitted and received data signals comprise frequency shift keying (FSK) modulated signals.

15. A communications system for transmitting and receiving voice signals and data signals which have a higher frequency than the voice signals simultaneously on each of a plurality of 2-wire signal lines, comprising:
   a terminal side including a plurality of terminals respectively coupled to the plurality of 2-wire signal lines, each of said plurality of terminals including:
      first transmitting and extracting means, coupled to the corresponding 2-wire signal line, for receiving data signals and voice signals from the 2-wire signal line, for passing the voice signals, for extracting the received data signals which have a higher frequency than the voice signals, for transmitting voice signals and data signals to be transmitted onto the 2-wire signal line;

obstructing means, coupled to said first transmitting and extracting means, for receiving the received voice signals, for obstructing the received data signals and for providing the received voice signals as an output;

a hybrid circuit, coupled to said obstructing means, for receiving the received voice signals which pass through said first transmitting and extracting means and said obstructing means, and for transmitting the voice signals to be transmitted onto the 2-wire signal line via said obstructing means and said first transmitting and extracting means, said obstructing means acting as a high impedance against the frequencies of the voice signals and as a low impedance against the higher frequencies of the received data signals to prevent the received data signals from being transmitted to said hybrid circuit; and data signal transmitting/receiving means, coupled to said first transmitting and extracting means, for separately receiving the received data signals extracted by said first transmitting and extracting means, and for transmitting the data signals to be transmitted to said first transmitting and extracting means based on a predetermined time division mode; and an exchange side coupled to said plurality of 2-wire signal lines, including:

a plurality of second transmitting and extracting means, respectively coupled to the 2-wire signal lines, each of said second transmitting and extracting means for receiving data signals and voice signals from the corresponding 2-wire signal line, for passing the voice signals, for extracting the received data signals which have a higher frequency than the voice signals, from the corresponding 2-wire signal line and for transmitting voice signals and data signals to be transmitted onto the corresponding 2-wire signal line; and means, coupled to each of said plurality of second transmitting and extracting means, for causing said second transmitting and extracting means to extract the received data signals and transmit the data signals to be transmitted based on a predetermined time division mode.

16. A communications system as set forth in claim 15, wherein said exchange side further comprises:

a plurality of exchange side obstructing means, respectively coupled to said plurality of second transmitting and extracting means, for receiving the received voice signals, for obstructing the received data signals and for providing the received voice signals as outputs; and a plurality of exchange side hybrid circuits, respectively coupled to said plurality of exchange side obstructing means, for receiving the received voice signals and for transmitting the voice signals to be transmitted onto the respective 2-wire signal lines via said plurality of exchange side obstructing means and said plurality of second transmitting and extracting means.

17. A communications system as set forth in claim 15, wherein said means for causing said second transmitting and extracting means to extract the received data signals comprises:

a multiplexer connected to each of said second transmitting and extracting means;
a demodulator connected to said multiplexer;
a modulator; and
a demultiplexer connected to said modulator and to each of said second transmitting and extracting means.

* * * * *

UNITED STATES PATENT AND TRADEMARK OFFICE
CERTIFICATE OF CORRECTION

PATENT NO. : 4,670,874
DATED : JUNE 2, 1987
INVENTOR(S) : KAZUHIRO SATO ET AL.

It is certified that error appears in the above-identified patent and that said Letters Patent is hereby corrected as shown below:

*Col. 1, line 49, "T" (all occurrences) should be --R--.

Col. 6, line 37, "+" should be --$\pm$--.

Signed and Sealed this

Twelfth Day of January, 1988

Attest:

DONALD J. QUIGG

*Attesting Officer*      *Commissioner of Patents and Trademarks*